(12) United States Patent
Oksanen

(10) Patent No.: US 7,548,992 B2
(45) Date of Patent: Jun. 16, 2009

(54) METHOD FOR PREPARING A DECISION TREE FOR PACKET PROCESSING

(75) Inventor: Kenneth Oksanen, Helsinki (FI)

(73) Assignee: SafeNet, Inc., Belcamp, MD (US)

( * ) Notice: Subject to any disclaimer, the term of this patent is extended or adjusted under 35 U.S.C. 154(b) by 965 days.

(21) Appl. No.: 10/402,734

(22) Filed: Mar. 28, 2003

(65) Prior Publication Data

US 2005/0278454 A1 Dec. 15, 2005

(51) Int. Cl.
G06F 15/173 (2006.01)
(52) U.S. Cl. .................................... 709/244
(58) Field of Classification Search ............... 709/244, 709/249; 370/389, 401
See application file for complete search history.

(56) References Cited

U.S. PATENT DOCUMENTS

| | | | | | |
|---|---|---|---|---|---|
| 5,983,200 | A | * | 11/1999 | Slotznick | 705/26 |
| 6,289,013 | B1 | * | 9/2001 | Lakshman et al. | 370/389 |
| 6,990,513 | B2 | * | 1/2006 | Belfiore et al. | 709/203 |
| 7,007,035 | B2 | * | 2/2006 | Kamath et al. | 707/102 |
| 7,039,641 | B2 | * | 5/2006 | Woo | 707/100 |
| 7,133,400 | B1 | * | 11/2006 | Henderson et al. | 370/389 |

OTHER PUBLICATIONS

Andrade et al. Decision Tree Construction for Data Mining on Cluster of Shared-Memory Multiprocessor. May 2001. pp. 1-8.*

Pankaj Gupta, Algorithms for Routing Lookups and Packet Classification, Published 2000 archived via Wayback Machine at www.archive.org to Aug. 2001, 223 pages.*

"Multidimensional Access Methods," Volker Gaede and Oliver Günther, ACM Computing Surveys, 1997.

"Multidimensional Access Methods," Volker Gaede and Oliver Günther, ACM Computing Surveys, vol. 30, No. 2, Jun. 1998.

* cited by examiner

*Primary Examiner*—Andrew Caldwell
*Assistant Examiner*—Grant Ford
(74) *Attorney, Agent, or Firm*—Drinker Biddle & Reath, LLP

(57) ABSTRACT

The invention relates to methods for processing data packets according to a set of rules, and especially for preparing of decision trees for selecting the correct rule for processing of a data packet. In preparation of a decision tree, a splitting point within a dimension being studied is chosen as follows. The rules are sorted to allow monotonous iteration through all range end values specified in the rules in the dimension being studied. The range end values are then iterated through in a monotonous fashion, either increasing or decreasing. At each iteration, the number of range low end values and the number of range high end values being equal to the current iteration value is counted. From these counts and the accumulated results from the corresponding counts in previous iterations, the numbers of rules with ranges in different positions relative to the current iteration value are deduced, and from these values, the goodness of the iteration value is calculated. After iteration of all range end values within the studied dimension, the iteration value with the best goodness is selected.

9 Claims, 3 Drawing Sheets

```
                        100
n_g = n_rules          /\/
zeroize other counters while ( there exists rules, which have at least one
        range end higher than x )  {
                                              110
    1. pick the next split point candidate from/\/
       the ordered set of all rule range ends in
       the dimension being studied
                                           120
    2. count number1 of rules which have /\/
       high-end == x, and:

n_le += number1
           n_e  -= number1
                                           130
    3. count number2 of rules which have /\/
       low-end == x, and:

n_g  -= number2
           n_ge += number2
                                           140
    4. compute goodness of the candidate   /\/
       value x from counters
                                       150
    5. prepare for next round         /\/ n_l += n_le
           n_e += n_ge
           zeroize n_le and n_ge
}
```

```
n_g = n_rules                    100
zeroize other counters while ( there exists rules, which have at least one
        range end higher than x )   {
                                                    110
    1. pick the next split point candidate from
       the ordered set of all rule range ends in
       the dimension being studied
                                              120
    2. count number1 of rules which have
       high-end == x, and:

n_le += number1
           n_e  -= number1
                                              130
    3. count number2 of rules which have
       low-end == x, and:

n_g  -= number2
           n_ge += number2
                                         140
    4. compute goodness of the candidate
       value x from counters
                                150
    5. prepare for next round n_l += n_le
           n_e += n_ge
           zeroize n_le and n_ge
}
```

Fig. 1

```
n_g = n_rules                    /200
zeroize other counters while ( there exists rules, which have at least one
        range end higher than x )  {
                                                    /210
   1. pick the next split point candidate from
      the ordered set of all rule range ends in
      the dimension being studied
                                        /220
   2. count number1 of rules which have
      high-end == x, and:

n_le += number1
          n_e  -= number1
                                        /230
   3. count number2 of rules which have
      low-end == x, and:

n_g -= number2 check how many of these rules have
          low-end ==high-end, add that to n_ex
          add the remainder of number2 to n_ge 4. compute goodness of the candidate /240
      value x from counters
                          /250
   5. prepare for next round n_l += n_le + n_ex
      n_e += n_ge
      zeroize n_ex, n_le, and n_ge
}
```

Fig. 2

METHOD FOR PREPARING A DECISION TREE FOR PACKET PROCESSING

BACKGROUND OF THE INVENTION

1. Field of the Invention

The invention relates to methods for processing data packets according to a set of rules, and especially to methods for preparation of decision trees for selecting the correct rule for processing a received data packet.

2. Description of Related Art

Data packets are processed according to a set of rules in certain applications in network devices, such as in firewalls and IPsec devices. Internet Protocol data packets have a number of parameters, such as source IP address, source IP port, destination IP address, and destination IP port. IP version 4 packet format is described in RFC 791, "Internet Protocol", J. Postel, September 1981. IP version 6 packet format is described in RFC 2460, "Internet Protocol, Version 6 (IPv6) Specification", S. Deering and R. Hinden, December 1998.

Packet processing rules are typically set by the network administrators to control packet processing at a network node. A firewall processing rule may for example direct the node to process only packets originating from a certain IP address or an address range; or, for example, to reject packets from an IP address or an IP address range. In the general case, any fields of the data packets can be used as rule parameters. In the specific case of firewalls and IPsec nodes, the most commonly used parameters are the source and destination IP addresses and TCP or UDP port numbers. However, a packet processing unit can also observe the payload of the IP packet, such as any other header values of TCP or UDP headers, or header or payload field values of any other protocol packets within the IP, TCP, or UDP packet. The logic for selecting a matching rule may be quite complicated. It may involve an arbitrary combination of checking the protocol, network interface, source and destination IP numbers, source and destination port numbers, and possibly other conditions. Some of these parameters are not restricted to single values, as a rule may specify a range of allowed values.

In operation, a packet processing unit—be it then a firewall, an IPsec node, or any other network device processing packets on the basis of processing rule—receives a packet, then examines the rules to find out which rule matches the packet, and then processes the packet according to the instructions given in the rule. Here, matching means that particular parameter values in the packet are equal to or within the range of parameter values recited in the rule. More than one rule may match the packet, in which case the rule with highest preference is applied. The highest preference may simply mean the first rule to match the packet. A default processing may be applied in case no rule matches the packet.

Rule lookup must be very efficient, especially for cases where very short lived connections are frequent. A slow rule lookup mechanism could also be prone to denial of service attacks. It is also important to be able to update rules relatively efficiently, particularly if the rules change frequently.

Performance problems arise in the process of finding the correct rule for a given packet when the number of rules is large. A simple approach of finding the correct rule is to check each rule in turn for each packet. This is quite feasible for some tens or hundreds of rules for an average personal computer at the time of writing of this patent application. However, when the amount of rules is in tens of thousands or higher, such a simple method is not adequate.

A more efficient method employs decision trees, which when properly construed can enable a fast lookup of the correct rule from a large set of rules.

Since rules can hold any number of attributes which must match to the given packet, and since some of these attributes may have a possibly infinite range of allowed values, the problem of finding the rule for a given packet is equivalent to finding the highest precedence N-dimensional rectangle containing a given point. This problem is studied in the field of spatial access methods, as they are known in computer science. Spatial access methods have been studied widely in the literature and tens of solutions have been presented. See for example the article "Multidimensional Access Methods" by V. Gaede and O. Gunther, ACM Computing Surveys, 1997, which is incorporated herein by reference. Most of them have the drawback that a search operation may not have a guaranteed logarithmic upper bound, but may have to delve into several search paths before finding the surrounding rectangle. Practically all of these spatial access methods are designed for graphical information systems or cartography with relatively little overlapping and a more modest number of dimensions. Some solutions are designed for storing the data on disk and are suboptimal for a purely main memory setting. In general, a method for building a decision tree that is efficiently able to cope with ranges specified by rules in many different dimensions is needed.

A simplistic solution would be to search in one dimension (i.e. study one parameter at a time). In other words the search tree would be devised so that a one-dimensional search structure such as a binary tree is constructed for the possible values in that dimension until the set of possibly matching rules in each leaf can no longer be reduced. Then, for each of these subtrees, the next dimension is used to construct the next level of binary trees, and so forth.

Although search cost in such a cascaded binary tree would be relatively efficient, it would have the adverse effect of consuming unnecesarily much memory for some inputs. Because the rigid order in which subtree divisions are made, it is impossible to exploit a high selectivity in a dimension that is used for narrowing the search in the later subtrees. Therefore a rule may appear in many more leaves of the tree than would be necessary.

Building globally optimal decision trees is an NP-hard problem, but the typical greedy algorithms described in many AI text books practically always build quite sufficiently optimal decision trees for sets of data points. The greedy algorithms generally work as follows: given a set of data points (such as example data in case-based reasoning problems), pick a splitting point which divides the set of data points as well as possible according to some measure, let that splitting point be the key of the root of the decision tree, and perform the same recursively for both subsets of rules for the subtrees. In the case of packet processing, the most significant difference to the standard text book case is that the decision tree is not prepared according to a set of point data, but for a set of rules which span over possibly overlapping ranges. This has two effects: Firstly, the rule sets applicable to subtrees are not disjoint, and therefore a given rule can be encountered in many subtrees of a given node. Secondly, and more significantly, because rules apply to ranges of values instead of single points, a better splitting point selection algorithm is needed than the classic algorithm of splitting according to the median of the data points' values in some dimension.

SUMMARY OF THE INVENTION

An object of the invention is to realize a method for preparing decision trees for packet processing faster than the solutions known in prior art. A further object of the invention is to realize a computer program and a network device which are able to process changes in packet processing rules faster than in the prior art.

The objects are reached by using a method for choosing the optimum splitting point which is capable to handle ranges of values, and optimising the process of selection of the most suitable splitting point in one dimension during preparation of a decision tree.

The method according to the invention is characterized by that, which is specified in the independent method claim. The computer program according to the invention is characterized by that, which is specified in the independent claim directed to a computer program. The electronic device according to the invention is characterized by that, which is specified in the independent claim directed to an electronic device. The dependent claims describe further advantageous embodiments of the invention.

In an advantageous embodiment of the invention, a splitting point within a dimension being studied is chosen as follows. The rules are sorted to allow monotonous iteration through all range end values specified in the rules in the dimension being studied. The range end values are then iterated through in a monotonous fashion, either increasing or decreasing. At each iteration, the number of range low end values and the number of range high end values being equal to the current iteration value is counted. From these counts and the accumulated results from the corresponding counts in previous iterations, the numbers of rules with ranges in different positions relative to the current iteration value are deduced, and from these values, the goodness of the iteration value is calculated. After iteration of all range end values within the studied dimension, the iteration value with the best goodness is selected.

BRIEF DESCRIPTION OF THE DRAWINGS

Various embodiments of the invention will be described in detail below, by way of example only, with reference to the accompanying drawings, of which FIG. 1 illustrates a method according to an advantageous embodiment of the invention, FIG. 2 illustrates a further method according to an advantageous embodiment of the invention.

DETAILED DESCRIPTION OF THE PREFERRED EMBODIMENTS

Figure 3:
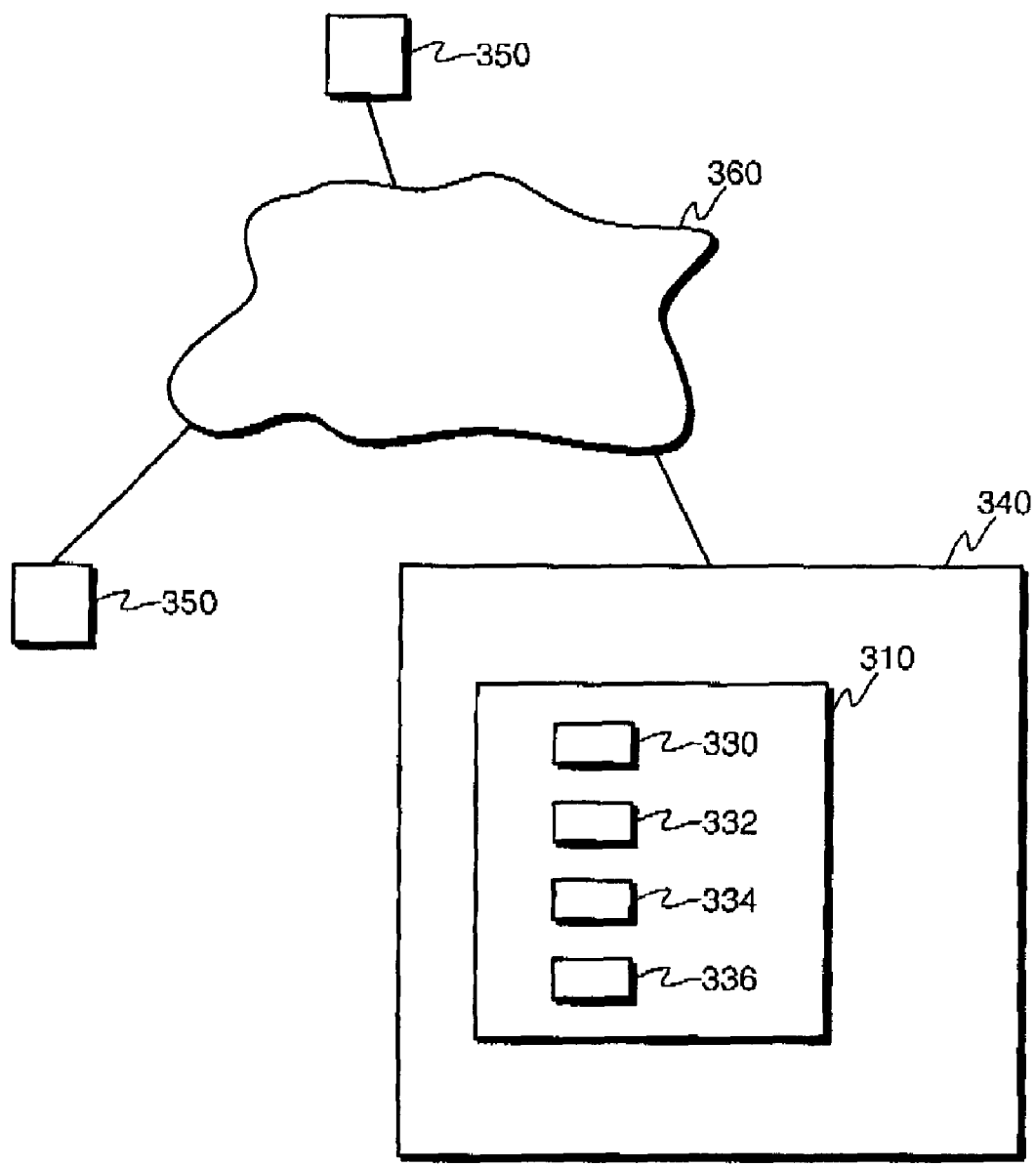
FIG. 3 illustrates certain advantageous embodiments of the invention.

The exemplary embodiments of the invention presented in this description are not to be interpreted to pose limitations to the applicability of the appended claims. The verb "to comprise" is used as an open limitation that does not exclude the existence of also unrecited features. The features recited in depending claims are mutually freely combinable unless otherwise explicitly stated.

In the following, the specifics of a part of the process of creating a decision tree is discussed in great detail, namely that of the process of selection of the splitting point within one parameter dimension for use at a node in the decision tree. The general features and methodology of creating decision trees are not described any further, as creation of decision trees is a well-known basic subject for a man skilled in the art. General information on creation of decision trees can be found from basic textbooks in computing science.

In an advantageous embodiment of the invention, the positions of ranges specified in the set of rules are taken into account during the iteration through range end values using five different counters:

a first counter, here denoted n_l, representing the number of rules whose both range end values are below the iteration value, here denoted x;

a second counter, here denoted n_le, representing the number of rules whose low range end value is smaller than x but whose high range end value is equal to x;

a third counter, here denoted n_ge, representing the number of rules whose low range end value is equal to x but whose high range end value is larger than x;

a fourth counter, here denoted n_e, representing the number of rules whose low range end value is lower than x but whose high range end value is larger than x; and a fifth counter, here denoted n_g, representing the number of rules whose both range end values are higher than x.

Note that in a set of rules having only range values in the studied dimension, each rule belongs to exactly one of these categories.

In a further advantageous embodiment, a sixth counter, here denoted n_ex, is used to represent the number of rules which have a point value in the studied dimension, e.g. whose low and high range values are equal to each other and to x. This is needed for handling rule sets which comprise also point values in the studied dimension.

We emphasize that these notations of the counters, n_l, n_le, n_ge, n_e, n_g, and n_ex are used in the present specification only for convenience.

FIG. 1 illustrates an advantageous embodiment of the invention in a pseudo programming language. Initially, in step 100, the counters are initialized. The counter n_g is initialized to number of rules, and the other counters are zeroized. After the initialization step, a loop iterating through all range end values is entered. Within the loop, in step 110, the next split point candidate (the next range end value in the studied dimension) is selected to be the iteration value x. In the first time in the loop, the value is naturally the first of the values.

In step 120, the number of rules whose high range end value is equal to the candidate value x is counted. This result is added to counter n_le and subtracted from counter n_e.

In step 130, the number of rules whose low range end value is equal to the candidate value x is counted. This result is subtracted from counter n_g and added to counter n_ge.

In step 140, a goodness value corresponding to the currently selected candidate value is calculated on the basis of the values of counters n_le, n_ge, n_e, n_g, and n_l.

In step 150, preparations are made for the next iteration. The value of counter n_le is added to counter n_l, since those rules whose range high end value equals to x, will be in the class of rules whose range high end value is less than x in the next round. The value of the counter n_ge is added to counter n_e, since those rules whose range low end value is now equal to x will be in the class of rules whose range low end value is less than x in the next round. The counters n_le and n_ge are zeroized, as they are calculated again in the next round.

The steps 110 to 150 are repeated for all distinct values of x in the studied dimension.

It is noted that in the example of FIG. 1, the iteration is performed in a monotonously increasing fashion through all range end values in the studied dimension. As a man skilled in the art realizes, the iteration can also be made in the reverse direction The steps 120 and 130 need not be in the order specified in the example of FIG. 1. Also, the zeroization of counters n_le and n_ge can be performed within the loop before step 110.

We note here that the special case of point value rules can also be handled in step 120, i.e. in connection with counting of rules having range high end value equal to x.

FIG. 2 shows an example of a further advantageous embodiment of the invention. This example shows an example on how such sets of rules which have point values can be treated according to an advantageous embodiment of the invention.

Initially, in step 200, the counters are initialized. The counter n_g is initialized to number of rules, and the other counters are zeroized. After the initialization step, a loop iterating through all range end values is entered. Within the loop, in step 210, the next split point candidate (the next range end value in the studied dimension) is selected to be the iteration value x. In the first time in the loop, the value is naturally the first of the values.

In step 220, the number of rules whose high range end value is equal to the candidate value x is counted. This result is added to counter n_le and subtracted from counter n_e.

In step 230, the number of rules whose low range end value is equal to the candidate value x is counted. This result is subtracted from counter n_g. Also, of these rules, the number of rules which are point value rules i.e. whose low range end equals to high range end are counted and added to counter n_ex. The number of rules whose low range end value is equal to x but high range end value is higher than x is added to counter n_ge.

In step 240, a goodness value corresponding to the currently selected candidate value is calculated on the basis of the values of counters n_le, n_ge, n_e, n_g, n_ex, and n_l.

In step 250, preparations are made for the next iteration. The values of counter n_le and counter n_ex are added to counter n_l, since those rules whose range high end value equals to x, will be in the class of rules whose range high end value is less than x in the next round. The value of the counter n_ge is added to counter n_e, since those rules whose range low end value is now equal to x will be in the class of rules whose range low end value is less than x in the next round. The counters n_ex, n_le, and n_ge are zeroized, as they are calculated again in the next round.

The steps 210 to 250 are repeated for all distinct values of x in the studied dimension.

It is noted that in the example of FIG. 2, the iteration is performed in a monotonously increasing fashion through all range end values in the studied dimension. As a man skilled in the art realizes, the iteration can also be made in the reverse direction The steps 220 and 230 need not be in the order specified in the example of FIG. 2. Also, the zeroization of counters n_ex, n_le, and n_ge can be performed within the loop before step 210.

We note here that the special case of point value rules can also be handled in step 220, i.e. in connection with counting of rules having range high end value equal to x.

We note here that the calculation of values of the counters in steps 120, 130, 220 and 230 in FIGS. 1 and 2 can be arranged in many ways. For example, the numbers of rules can be counted with an intermediate counter, whose value is then added to or subtracted from the other counters. It is clear for a man skilled in the art, that the counters n_le, n_e, n_g, n_ge, and n_ex can be incremented (or decremented, whichever the case) by one for each rule with an end value equal to x.

In both the examples of FIGS. 1 and 2, the condition of continued iteration—that there are some candidate values still left—can be very quickly determined by observing the values of the counters n_g and n_e. As long as at least one of these is larger than zero, at least one candidate value has not been considered yet. The condition can also be checked for example by comparing the latest considered candidate value to the largest known candidate value. The largest known candidate value can be found out before the iteration during sorting of the rules for facilitating quick counting of rules during the iteration.

The specific steps of how to obtain the next candidate value during the iteration can be arranged in many ways.

For example, in a further advantageous embodiment of the invention, prior to the iteration in the studied dimension the rules are arranged in two sequences, in the first of which the rules are sorted according to the low end value of the parameter ranges of the rules, and in the second of which the rules are sorted according to the high end value of the parameter ranges of the rules. By sorting the sequences, the counting of rules having a range end value equal to the candidate value can be performed without checking all rules. In this embodiment, a first index value indicates the next rule to be considered in the first sequence, and a second index value indicates the next rule to be considered in the second sequence. During the iteration, e.g. in step 110 of FIG. 1 or step 210 of FIG. 2, the next candidate value can be obtained by selecting the smallest range end value of the rules indicated by the first index value and the second index value. The counting of rules with range end values equal to the candidate value can be effected during the iteration by increasing the first and second index values repeatedly as long as the low range end value for the first sequence or, correspondingly, the high range end value for the second sequence are equal to the candidate value.

The objective, efficient consideration of all distinct values of range low and high end values in a monotonously increasing or decreasing sequence and efficient counting of rules having a range end value equal to the candidate value during the iteration, can be reached also via other arrangements, as a man skilled in the art realizes. In a further advantageous embodiment of the invention, a single sorted sequence is created, in which each rule is listed in according to both its low range end value and its high range end value. In such an embodiment, the counting of those rules whose low range value equals the candidate value and those whose high range value equals the candidate value can be arranged in a single loop by continuing to increment the index to the single list as long as the range value at the indexed position is the same, and by selecting the counters to be incremented (or decremented) by checking whether it is the lower or the higher end of the particular rule at the index position which is equal to the candidate value.

DESCRIPTION OF CERTAIN FURTHER
ASPECTS OF THE INVENTION

According to a first aspect of the invention, a method for selection of a splitting point value for use in preparation of a decision tree on the basis of a set of packet processing rules for processing data packets is provided. The method comprises at least the steps of selecing a splitting point candidate value from a set of rule parameter range end values in the parameter dimension being studied, changing a first counter for each rule with a first range end value being equal to said selected candidate value, changing a second counter for each rule with a second range end value being equal to said selected candidate value, and computing a goodness value for said selected candidate value at least partially on the basis of the values of said first and second counters.

According to a further advantageous embodiment of the invention, the method further comprises at least the step of repeating the steps recited in claim 1 for each unique value in a monotonous sequence in said set of rule parameter range end values.

According to a still further advantageous embodiment of the invention, the method further comprises at least the step of representing the relation of rules in comparison with a splitting point candidate by a first value representing the number of rules whose both range end values are below the splitting point candidate, a second value representing the number of rules whose low range end value is smaller than the splitting point candidate but whose high range end value is equal to the splitting point candidate, a third value representing the number of rules whose low range end value is equal to the splitting point candidate but whose high range end value is larger than the splitting point candidate, a fourth value representing the number of rules whose low range end value is lower than the splitting point candidate but whose high range end value is larger than the splitting point candidate, and a fifth value representing the number of rules whose both range end values are higher than the splitting point candidate.

According to a further advantageous embodiment of the invention, the method further comprises at least the step of representing the relation of rules in comparison with a splitting point candidate by a sixth value representing the number of rules having a point value in the studied dimension.

According to a second aspect of the invention, a computer program for processing data packets according to a set of rules is provided. Such an aspect is illustrated in FIG. 3. According to an advantageous embodiment, the computer program 310 comprises at least program instructions 330 for selecting a splitting point candidate value from a set of rule parameter range end values in the parameter dimension being studied, program instructions 332 for changing a first counter for each rule with a first range end value being equal to said selected candidate value, program instructions 334 for changing a second counter for each rule with a second range end value being equal to said selected candidate value, and program instructions 336 for computing a goodness value for said selected candidate value at least partially on the basis of the values of said first and second counters.

These program instructions 332 and 334 effectively count the number of rules having range ends equal to the selected candidate value, as described earlier in this specification.

According to a further advantageous embodiment of the invention, the computer program is embodied on a record medium. For example, the record medium can be a floppy disk, a hard drive, a CD-ROM, or magnetic tape.

According to an even further advantageous embodiment of the invention, the computer program is stored in a computer memory.

According to a still further advantageous embodiment of the invention, the computer program is embodied in a read-only memory. For example, the read-only memory can be a CD-ROM or a DVD-ROM disc, or an integrated circuit.

According to an advantageous embodiment of the invention, the computer program is carried on an electrical carrier signal.

According to a third aspect of the invention, an electronic device for processing of data packets according to a set of rules is provided. FIG. 3 also illustrates a electronic device 340, which communicates with other network nodes 350 via a data network 360. According to an advantageous embodiment of the invention, the electronic device 340 comprises at least selecting means 330 for selecting a splitting point candidate value from a set of rule parameter range end values in the parameter dimension being studied, first changing means 332 for changing a first counter for each rule with a first range end value being equal to said selected candidate value, second changing means 334 for changing a second counter for each rule with a second range end value being equal to said selected candidate value, and computing means 336 for computing a goodness value for said selected candidate value at least partially on the basis of the values of said first and second counters.

According to an advantageous embodiment of the invention, the device 340 is an integrated circuit. For example, the integrated circuit can be an ASIC circuit, a FPGA circuit or another type of integrated ciruit comprising the inventive functionality.

According to a further advantageous embodiment of the invention, the device 340 is a computer. For example, in this embodiment, the inventive functionality can be effected by software loaded in the computer. The inventive functionality can also be effected for example in hardware inside the computer, using for example an integrated circuit or a circuit board comprising the inventive functionality, in which case the processor of the computer can offload the task of choosing the splitting point.

The device 340 can also be an IPsec node, for example an IPsec gateway performing IPsec processing for decrypting and encrypting of data traffic. The device 340 can also be a firewall node.

Further Considerations

The invention has many advantages. For example, the inventive method is able to handle large numbers of rules with ranges. Also, the method is fast especially with large numbers of rules.

A simple brute force method for calculating the goodness would be as follows:

1. iterate through all range end points x in the studied dimension 2. during each iteration, go through each rule, and 2a. if the lower range end value and the higher range end value of the rule are both lower than x, increment a first counter 2b. if the lower range end value of the rule is less than or equal to x and the higher range end value of the rule is larger than or equal to x, increment a second counter 2a. if the lower range end value and the higher range end value of the rule are both higher than x, increment a third counter 3. at the end of each iteration, calculate goodness of x according to some metric, and zeroize the first, second and third counters
4. return to 2 for the next iteration This simple method is quadratic in time in relation to the number of rules. Such a method suffices for small number of rules, but when the number of rules is increased to hundreds of thousands of rules or more, the quadratic behavior makes the simple brute force method too slow. The inventive method is able to scale even to millions of rules.

The invention is very advantageous in situations, where the number of rules is very large. The invention is also very advantageous also in cases where a device with a low computing power is used in a situation where the number of rules is not very large, but large enough to cause performance issues for a device of a low computing power. Such a device is commonly called an appliance device.

The invention can be applied in any situation, where data packets are processed according to a set of rules, and the processing rule applied to a particular packet is selected on the basis of parameter values within the packet. Examples of such uses are processing of packets at an IPsec gateway or client node; at a firewall computer; or for example in a routing node. However, the use of the invention is not limited to these examples only.

Calculation of a goodness value for a candidate splitting point value on the basis of the counter values can be performed in many ways. The invention is not restricted to calculation of the goodness value from the counter values in any specific way. A man skilled in the art can devise many different ways to calculate a goodness value. The calculation method depends on the desired objective; one can for example aim to minimize the average path length traversed in the decision tree before finding the correct rule. As another example, one can aim to minimize the maximum path length (i.e. height of the decision tree). These different aims require different calculation methods. The most suitable calculation method is dependent on the requirements of the particular application and the requirements of the situation where the invention is applied, whereby the invention cannot be limited to any specific goodness calculation method.

The computer program product can be implemented in many different ways. For example, the computer program product can be implemented as an application program executed in a computer device or as an application program stored on a computer readable media such as a hard disk, a CD-ROM, an electronic memory module, or on on other media. The computer program product can also be implemented as a subroutine library for inclusion in other programs.

In view of the foregoing description it will be evident to a person skilled in the art that various modifications may be made within the scope of the invention. While a preferred embodiment of the invention has been described in detail, it should be apparent that many modifications and variations thereto are possible.

The invention claimed is:

1. Method for selection of a splitting point value for use in preparation of a decision tree on the basis of a set of packet processing rules for processing data packets, comprising at least the steps of:
selecting a splitting point candidate value from a set of rule parameter range end values in a parameter dimension being studied;
changing a first counter for each rule with a first range end value being equal to said selected candidate value;
changing a second counter for each rule with a second range end value being equal to said selected candidate value;
representing the relation of rules in comparison with the splitting point candidate by
a first value representing the number of rules whose both range end values are below the splitting point candidate;
a second value representing the number of rules whose low range end value is smaller than the splitting point candidate but whose high range end value is equal to the splitting point candidate;
a third value representing the number of rules whose low range end value is equal to the splitting point candidate but whose high range end value is larger than the splitting point candidate;
a fourth value representing the number of rules whose low range end value is lower than the splitting point candidate but whose high range end value is larger than the splitting point candidate; and
a fifth value representing the number of rules whose both range end values are higher than the splitting point candidate;
computing a goodness value for said selected candidate value at least partially on the basis of the values of said first and second counters; and
storing the goodness value for said selected candidate value in a computer readable medium.

2. A method according to claim 1, further comprising at least the step of
repeating the steps recited in claim 1 for each unique value in a monotonous sequence in said set of rule parameter range end values.

3. A method according to claim 1, further comprising at least the step of representing the relation of rules in comparison with a splitting point candidate by
a sixth value representing the number of rules having a point value in the studied dimension.

4. A computer-readable storage medium storing computer readable program code for causing a computer to perform the steps of:
selecting a splitting point candidate value from a set of rule parameter range end values in a parameter dimension being studied;
changing a first counter for each rule with a first range end value being equal to said selected candidate value;
changing a second counter for each rule with a second range end value being equal to said selected candidate value;
representing the relation of rules in comparison with the splitting point candidate by
a first value representing the number of rules whose both range end values are below the splitting point candidate;
a second value representing the number of rules whose low range end value is smaller than the splitting point candidate but whose high range end value is equal to the splitting point candidate;
a third value representing the number of rules whose low range end value is equal to the splitting point candidate but whose high range end value is larger than the splitting point candidate;
a fourth value representing the number of rules whose low range end value is lower than the splitting point candidate but whose high range end value is larger than the splitting point candidate; and a fifth value representing the number of rules whose both range end values are higher than the splitting point candidate;

computing a goodness value for said selected candidate value at least partially on the basis of the values of said first and second counters; and storing the goodness value for said selected candidate value in a computer readable medium.

5. An electronic device for processing of data packets according to a set of rules, comprising at least:

means for selecting a splitting point candidate value from a set of rule parameter range end values in a parameter dimension being studied;

means for changing a first counter for each rule with a first range end value being equal to said selected candidate value;

means for changing a second counter for each rule with a second range end value being equal to said selected candidate value, means for representing the relation of rules in comparison with the splitting point candidate by a first value representing the number of rules whose both range end values are below the splitting point candidate;

a second value representing the number of rules whose low range end value is smaller than the splitting point candidate but whose high range end value is equal to the splitting point candidate;

a third value representing the number of rules whose low range end value is equal to the splitting point candidate but whose high range end value is larger than the splitting point candidate;

a fourth value representing the number of rules whose low range end value is lower than the splitting point candidate but whose high range end value is larger than the splitting point candidate; and a fifth value representing the number of rules whose both range end values are higher than the splitting point candidate; and;

means for computing a goodness value for said selected candidate value at least partially on the basis of the values of said first and second counters; and means for storing the goodness value for said selected candidate value in a computer readable medium.

6. An electronic device according to claim 5, wherein the device is an integrated circuit.

7. An electronic device according to claim 5, wherein the device is a computer.

8. An electronic device according to claim 5, wherein the device is an IPsec node.

9. An electronic device according to claim 5, wherein the device is a firewall node.

* * * * *